(12) United States Patent
Bahceci et al.

(10) Patent No.: US 12,483,306 B2
(45) Date of Patent: Nov. 25, 2025

(54) LOW-RANK BEAMFORMER FROM MULTI-LAYER PRECODER FEEDBACK

(71) Applicant: Telefonaktiebolaget LM Ericsson (publ), Stockholm (SE)

(72) Inventors: Israfil Bahceci, Kanata (CA); Ahmed Nouah, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 103 days.

(21) Appl. No.: 18/001,165

(22) PCT Filed: Jun. 29, 2020

(86) PCT No.: PCT/IB2020/056127
§ 371 (c)(1),
(2) Date: Dec. 8, 2022

(87) PCT Pub. No.: WO2022/003391
PCT Pub. Date: Jan. 6, 2022

(65) Prior Publication Data
US 2023/0223995 A1    Jul. 13, 2023

(51) Int. Cl.
  *H04B 7/0417*  (2017.01)
  *H04B 7/0456*  (2017.01)
  *H04B 7/06*    (2006.01)

(52) U.S. Cl.
  CPC ......... *H04B 7/0486* (2013.01); *H04B 7/0417* (2013.01); *H04B 7/0634* (2013.01); *H04B 7/0639* (2013.01)

(58) Field of Classification Search
  CPC .. H04B 7/0417; H04B 7/0634; H04B 7/0639; H04B 7/063; H04B 7/0486
  See application file for complete search history.

(56) References Cited

U.S. PATENT DOCUMENTS

| | | | |
|---|---|---|---|
| 2011/0142147 A1* | 6/2011 | Chen | H04W 24/10 375/260 |
| 2012/0201321 A1 | 8/2012 | Koivisto | |
| 2013/0279628 A1* | 10/2013 | Mizuta | H04B 7/0417 375/296 |
| 2017/0244519 A1 | 8/2017 | Yang et al. | |
| 2019/0386718 A1* | 12/2019 | Sengupta | H04B 7/0452 |

OTHER PUBLICATIONS

International Search Report and Written Opinion dated Feb. 26, 2021 issued in PCT Application No. PCT/IB2020/056127, consisting of 13 pages.

* cited by examiner

*Primary Examiner* — David S Huang
(74) *Attorney, Agent, or Firm* — Sonoda & Kobayashi Intellectual Property Law; Sarvajit S. Patil

(57) ABSTRACT

According to one or more embodiments, a network node configured to communicate with a wireless device is provided. The network node includes processing circuitry configured to: receive multilayer feedback; determine a beamformer for transmission of a first quantity of transmission layers where the beamformer is based at least on information, in the multilayer feedback, that is associated with a second quantity of transmission layers, where the first quantity of transmission layers is a less than the second quantity of transmission layers; and cause the transmission using the beamformer.

20 Claims, 9 Drawing Sheets

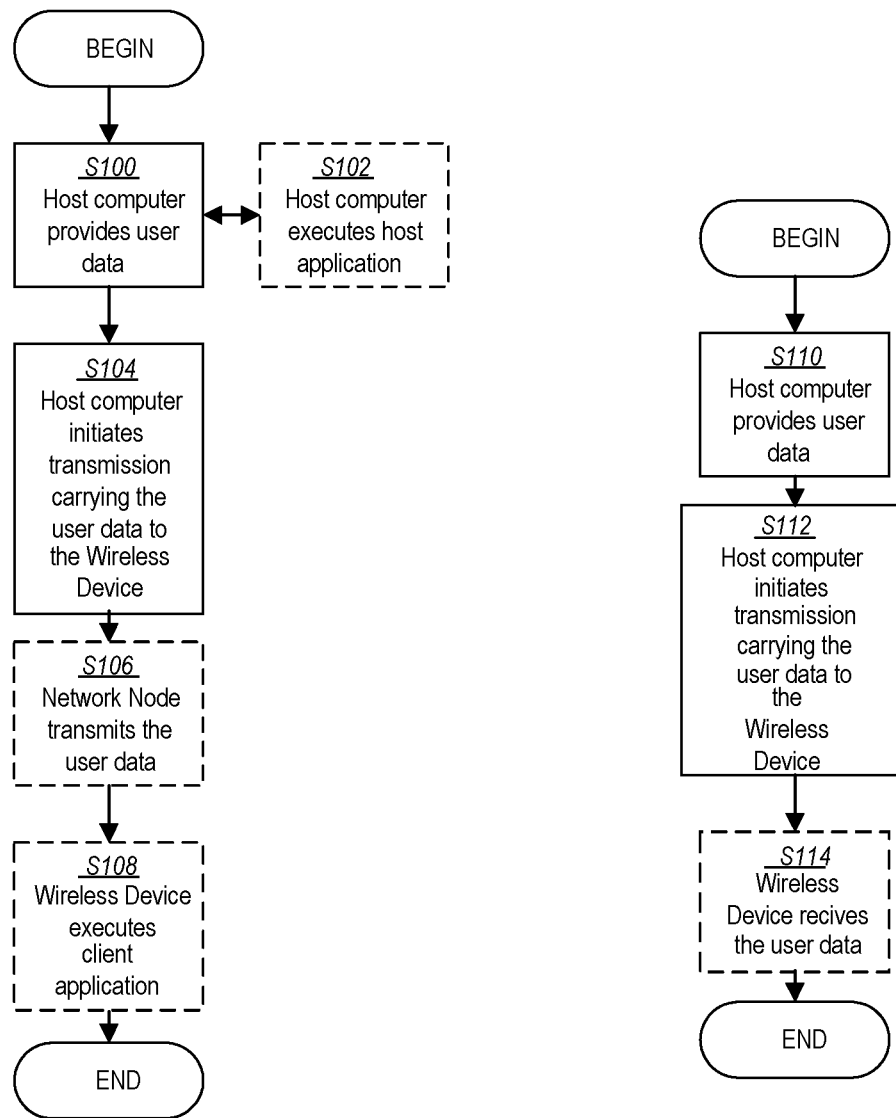

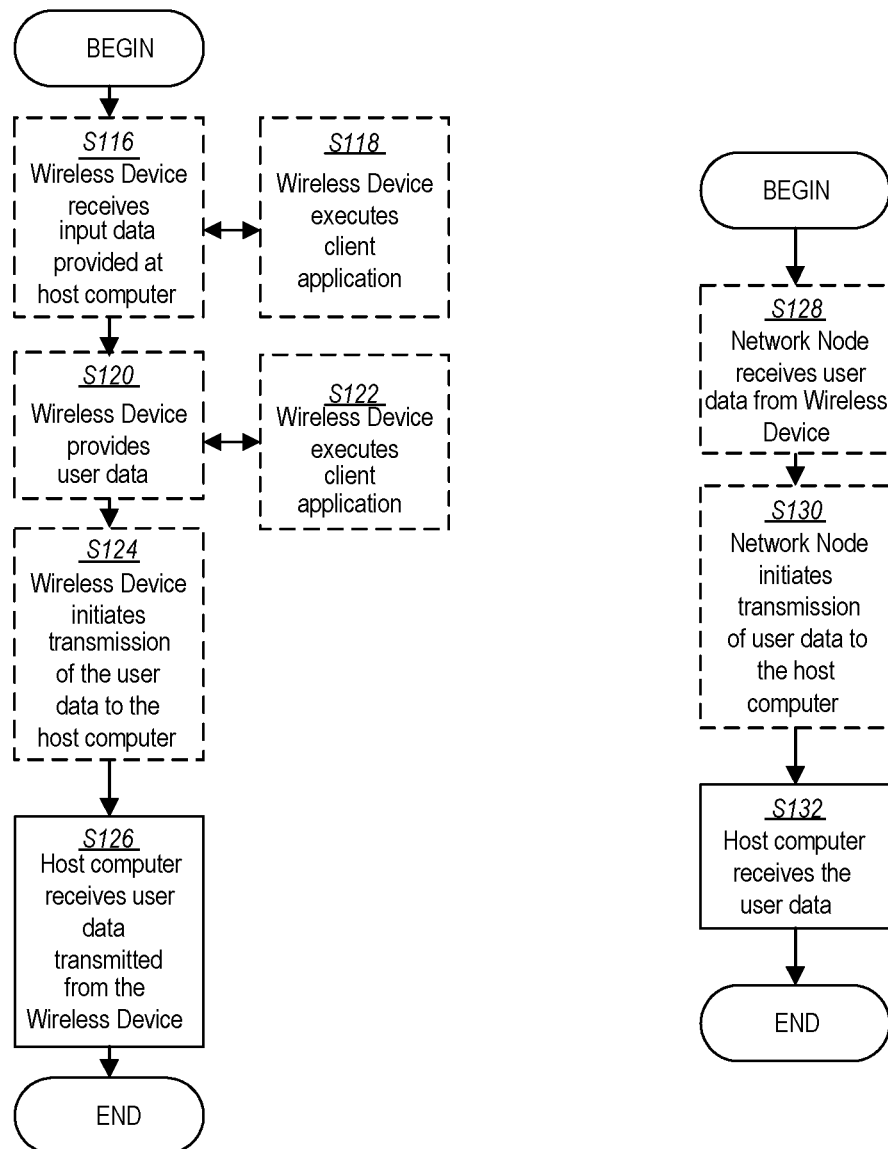

LOW-RANK BEAMFORMER FROM MULTI-LAYER PRECODER FEEDBACK

CROSS-REFERENCE TO RELATED APPLICATIONS

This application is a Submission Under 35 U.S.C. § 371 for U.S. National Stage Patent Application of International Application Number: PCT/IB2020/056127, filed Jun. 29, 2020 entitled "LOW-RANK BEAMFORMER FROM MULTI-LAYER PRECODER FEEDBACK," the entirety of which is incorporated herein by reference.

TECHNICAL FIELD

Wireless communication and in particular, a low rank beamforming based at least on multi-layer feedback.

BACKGROUND

A wireless network including a network node (e.g., gNB) or a transmitter may send the control data (e.g., physical downlink control channel (PDCCH)) over a single logical port (e.g., one layer), or a few ports using a beamformer is considered. When information regarding the wireless device's direction or channel is not available at the network node, the network node may prefer to employ common beamforming optimized for the cell shape. On the other hand, it is also possible to employ a wireless device specific beamformer. Third Generation Partnership Project (3GPP) Release 15+ (also referred to as New Radio (NR) or 5' Generation (5G)) allows for wireless device-specific beamforming for some of the control channel information transmission. Determining a suitable beamformer for such channels (e.g., PDCCH) using available feedback information can significantly improve the system performance as it may allow for simultaneously utilizing both multiplexing and diversity gains offered by multi-path propagation.

However, existing systems disadvantageously rely on a randomized beamformer. For example, when the network node attempts to perform wireless device specific beamforming to transmit data, if a codebook based Single User-Multiple Input Multiple Output (SU-MIMO) transmission is employed using Type-1 feedback, the Channel State Information-Reference Signal (CSI-RS) feedback contains (among others) a precoder matrix index (PMI) that indicates the wireless device's preference on the precoder to be used by network node. In case of rank>1 feedback, the PMI corresponds to a N_ports×RI precoder matrix where RI is the rank indicator. So, in 3GPP Release 15+ codebook, each column of the precoder in the codebook indicates a preferred direction for the corresponding layer. Since this precoder is evaluated with the specific constraint of sending RI layers, it may not directly indicate the best direction for a single-layer transmission or cases where it may be desired to overwrite the wireless device's desired/requested RI with a smaller value due to, for example, unprecedented channel conditions. In particular, PDCCH is transmitted using a single layer and if a wireless device specific beamforming is to be employed, existing systems attempt to randomize the beamformer among the directions indicated by the PMI. However, this may reduce the gains for some of the transmission instances since some of the directions may not be able to fully utilize the channel between the network node and the wireless device in a satisfactory manner.

Further, randomizing beamforming may also cause a flashlight effect in other cells. In addition, it may also create a non-stable PDCCH channel transmission for the wireless device when the PDCCH is being transmitted over a beam that is not suitable for single-layer transmission even though that direction may be suitable in case of multi-layer transmission. In other words, insufficient knowledge on the strength of the multipaths in the directions indicated by the wireless device may disadvantageously lead to mechanisms that perform wireless device specific beamforming without sufficient knowledge of the multipaths.

SUMMARY

Some embodiments advantageously provide a method and system for a low rank beamforming based at least on multi-layer feedback.

In one or more embodiments, a low-complexity and agile beam-former calculation method that may only require the knowledge of a precoder (or PMI) that is feedback from the wireless device to network node. It may be assumed that the feedback indicates multiple layer transmissions, e.g., RI>1. In this case, each column of the precoder contains a suitable beamformer for the corresponding layer. However, unlike existing system that simply randomly select a beamformer from among the directions, one or more embodiments described herein uses information on all the directions indicated by the precoder columns and determines a single or (a few if needed) beamformer that can generate a radiation pattern suitable for a single-layer (or lower-rank) transmission.

Further, based on, for example, the power requirements and tapering efficiencies, the precoder may be converted to a constant-modulus phased array beamformer. One or more embodiments described herein allows for a layer-weighting algorithm that is adaptable to the time-varying channels observed by the wireless device and that can dynamically determine the significance of each layer's direction to a multi-directional transmission carrying a single-layer data. Layer partitioning may be applied to one or more embodiments to groups of layers to create more than one stream if low-rank transmission having a rank larger than 1 is desired.

Further, in one or more embodiments, a dynamic beam-broadening method is applied to low-rank precoder to compensate the CSI feedback delays due to loss or incorrect reception of feedback. Also, one or more embodiments described herein can be combined with selective nulling techniques to avoid undesired interference creations towards interference-prone directions.

One or more embodiments advantageously use the information directly provided by the wireless device feedback such as not to require extra information to determine the beamformer for single layer transmission. One or more embodiments advantageously generate suitable single-layer or low-rank beamformers regardless of the underlying multipath propagation medium. The network node does not need to predict the channel realizations to determine the precoder as the network node may only require the knowledge of the precoder provided by the wireless device. One or more embodiments allows for constant modulus schemes (just employing the resulting phase-taper) and the transmitter does not suffer from array tapering loss. One or more embodiments provide a dynamic beam-broadening method that can be applied to low-rank precoders. In case of a rank−1 multi-lobe pattern, the beam-broadening scheme gradually expands the beam-width of individual lobes in each layer. One or more embodiments are extensible to different channel state information feedbacks available from a wireless device (e.g., Type-1/2 CSI feedback, SRS based channel estimation).

According to one embodiment of this aspect, a network node configured to communicate with a wireless device is provided. The network node includes processing circuitry configured to: receive multilayer feedback; determine a beamformer for transmission of a first quantity of transmission layers where the beamformer is based at least on information, in the multilayer feedback, that is associated with a second quantity of transmission layers and where the first quantity of transmission layers is a less than the second quantity of transmission layers; and cause the transmission using the beamformer.

According to one or more embodiments of this aspect, the multilayer feedback includes information associated with beam directions of the first quantity of transmission layers and information associated with directions of the second quantity of transmission layers. According to one or more embodiments of this aspect, the determining of the beamformer for the transmission of the first quantity of transmission layers includes: combining the information, in the multilayer feedback, associated with the second quantity of transmission layers, with the information associated with the first quantity of transmission layers; generating matrices based at least on the combined information; and performing one of a single value decomposition and weight mean vector function based on the matrices to obtain the beamformer for the transmission of the first quantity of transmission layers. According to one or more embodiments of this aspect, the weighted mean function includes applying weighting coefficients to the matrices.

According to one or more embodiments of this aspect, the first quantity of transmission layers is n, n being greater than 1, where the generating of matrices includes generating n matrices, where the single value decomposition being performed for each of n matrices; and where the processing circuitry being further configured to: select a singular vector for each single value decomposition to obtain a plurality of singular vectors; and the beamformer for the transmission of the first quantity of transmission layers being based at least on the plurality of singular vectors. According to one or more embodiments of this aspect, the beamformer for the transmission of the first quantity of transmission layers is a constant modulus beamformer. According to one or more embodiments of this aspect, the multilayer feedback is a Pre-coding Matrix Indicator, PMI. According to one or more embodiments of this aspect, the transmission using the beamformer is a single layer transmission in a physical downlink control channel.

According to another aspect of the disclosure, a method implemented by a network node that is configured to communicate with a wireless device is provided. Multilayer feedback is received. A beamformer for transmission of a first quantity of transmission layers is determined where the beamformer is based at least on information, in the multilayer feedback, that is associated with a second quantity of transmission layers where the first quantity of transmission layers is a less than the second quantity of transmission layers, and the transmission using the beamformer is caused.

According to one or more embodiments of this aspect, the multilayer feedback includes information associated with beam directions of the first quantity of transmission layers and information associated with directions of the second quantity of transmission layers. According to one or more embodiments of this aspect, the determining of the beamformer for the transmission of the first quantity of transmission layers includes: combining the information, in the multilayer feedback, associated with the second quantity of transmission layers, with the information associated with the first quantity of transmission layers; generating matrices based at least on the combined information; and performing one of a single value decomposition and weight mean vector function based on the matrices to obtain the beamformer for the transmission of the first quantity of transmission layers.

According to one or more embodiments of this aspect, the weighted mean function includes applying weighting coefficients to the matrices. According to one or more embodiments of this aspect, the first quantity of transmission layers is n, n being greater than 1, where the generating of matrices includes generating n matrices, where the single value decomposition being performed for each of n matrices; and where the processing circuitry is further configured to: select a singular vector for each single value decomposition to obtain a plurality of singular vectors; and the beamformer for the transmission of the first quantity of transmission layers being based at least on the plurality of singular vectors.

According to one or more embodiments of this aspect, the beamformer for the transmission of the first quantity of transmission layers is a constant modulus beamformer. According to one or more embodiments of this aspect, the multilayer feedback is a Pre-coding Matrix Indicator, PMI. According to one or more embodiments of this aspect, the transmission using the beamformer is a single layer transmission in a physical downlink control channel.

According to another aspect of the disclosure, a computer readable medium is provided. The computer readable medium is configured to store instructions, which when executed by a processor, cause the processor to: receive multilayer feedback; determine a beamformer for transmission of a first quantity of transmission layers where the beamformer is based at least on information, in the multilayer feedback, that is associated with a second quantity of transmission layers, and where the first quantity of transmission layers is a less than the second quantity of transmission layers; and cause the transmission using the beamformer.

According to one or more embodiments of this aspect, the multilayer feedback includes information associated with beam directions of the first quantity of transmission layers and information associated with directions of the second quantity of transmission layers. According to one or more embodiments of this aspect, the determining of the beamformer for the transmission of the first quantity of transmission layers includes: combining the information, in the multilayer feedback, associated with the second quantity of transmission layers, with the information associated with the first quantity of transmission layers; generating matrices based at least on the combined information; and performing one of a single value decomposition and weight mean vector function based on the matrices to obtain the beamformer for the transmission of the first quantity of transmission layers. According to one or more embodiments of this aspect, the multilayer feedback is a Pre-coding Matrix Indicator, PMI; and the transmission using the beamformer is a single layer transmission in a physical downlink control channel.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating example methods implemented in a communication system including a host computer, a network node and a wireless device for executing a client application at a wireless device according to some embodiments of the present disclosure;

FIG. 4 is a flowchart illustrating example methods implemented in a communication system including a host computer, a network node and a wireless device for receiving user data at a wireless device according to some embodiments of the present disclosure;

FIG. 5 is a flowchart illustrating example methods implemented in a communication system including a host computer, a network node and a wireless device for receiving user data from the wireless device at a host computer according to some embodiments of the present disclosure;

FIG. 6 is a flowchart illustrating example methods implemented in a communication system including a host computer, a network node and a wireless device for receiving user data at a host computer according to some embodiments of the present disclosure;

DETAILED DESCRIPTION

Figure 1:
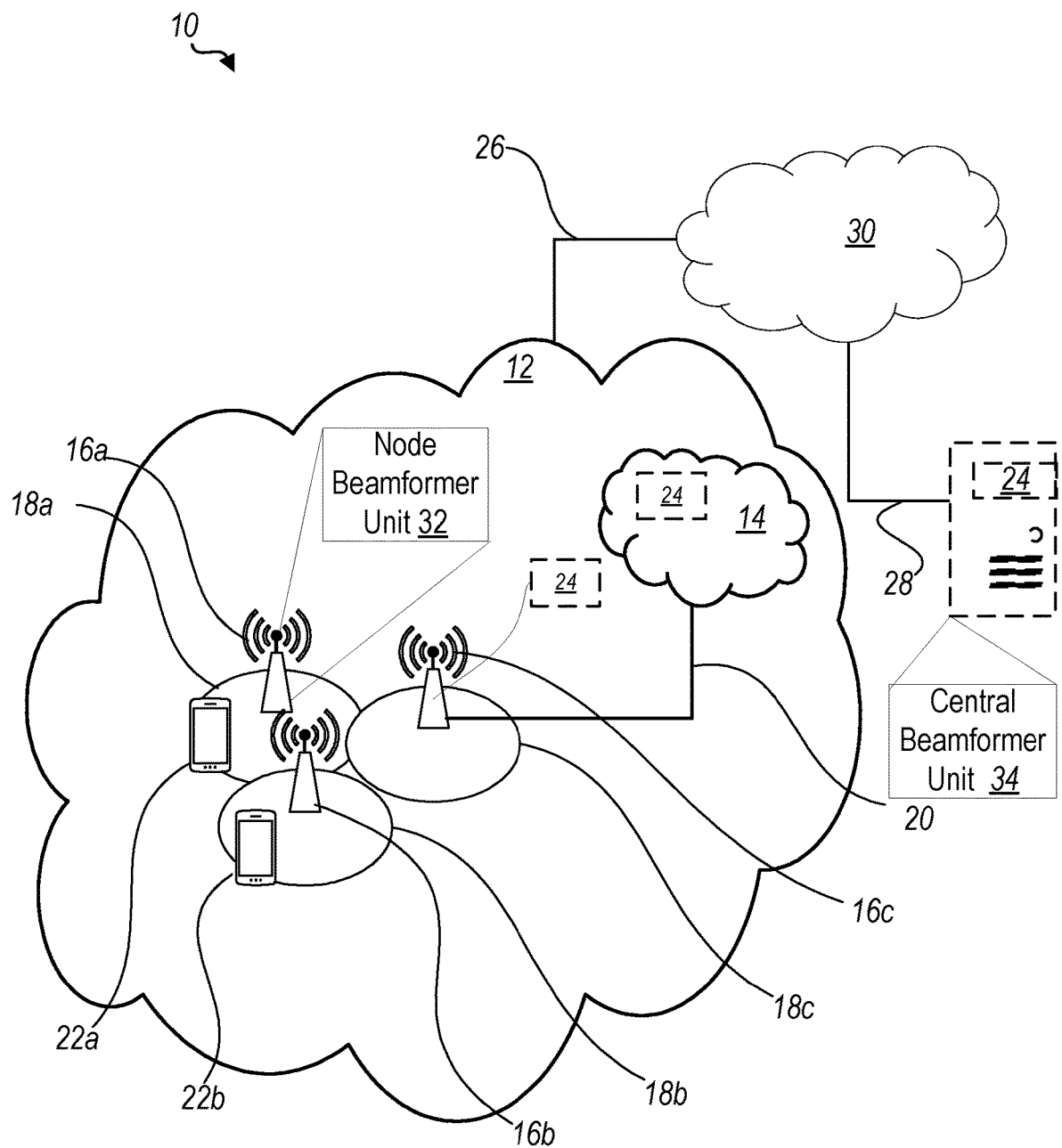
FIG. 1 is a schematic diagram of an example network architecture illustrating a communication system connected via an intermediate network to a host computer according to the principles in the present disclosure.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide a low rank beamforming based at least on multi-layer feedback.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a node beamformer unit 32 which is configured to perform one or more network node 16 functions as described herein such as with respect to a low rank beamforming based at least on multi-layer feedback. A host computer is configured to include a central beamformer unit 34 which is configured to perform one or more host computer functions as described herein such as with respect to a low rank beamforming based at least on multi-layer feedback.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include a central beamformer unit 54 configured to enable the service provider to perform one or more host computer functions as described herein such as with respect to a low rank beamforming based at least on multi-layer feedback.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include node beamformer unit 32 configured to perform one or more network node 16 functions as described herein such as with respect to a low rank beamforming based at least on multi-layer feedback.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
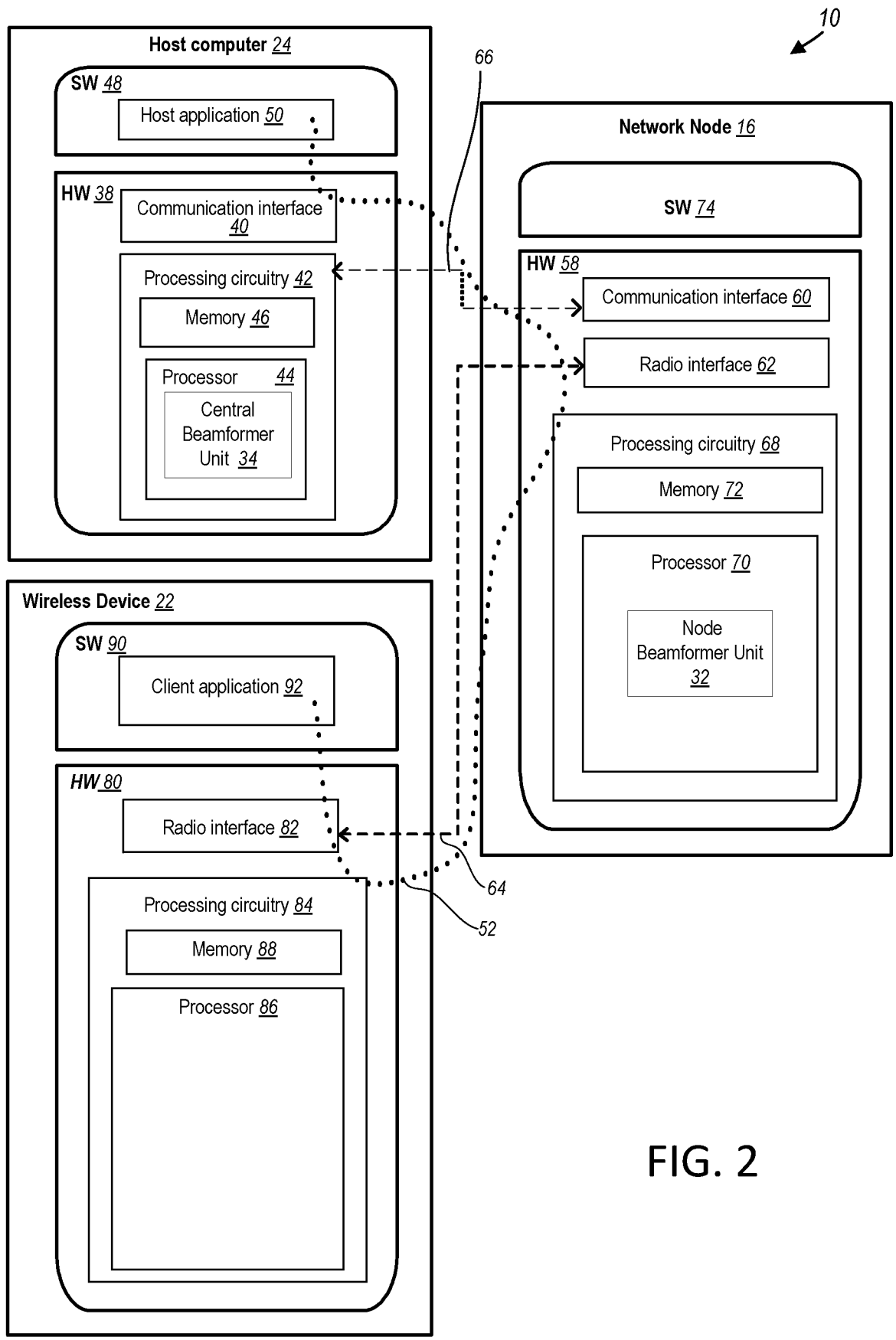
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as node beamformer unit 32, and central beamformer unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
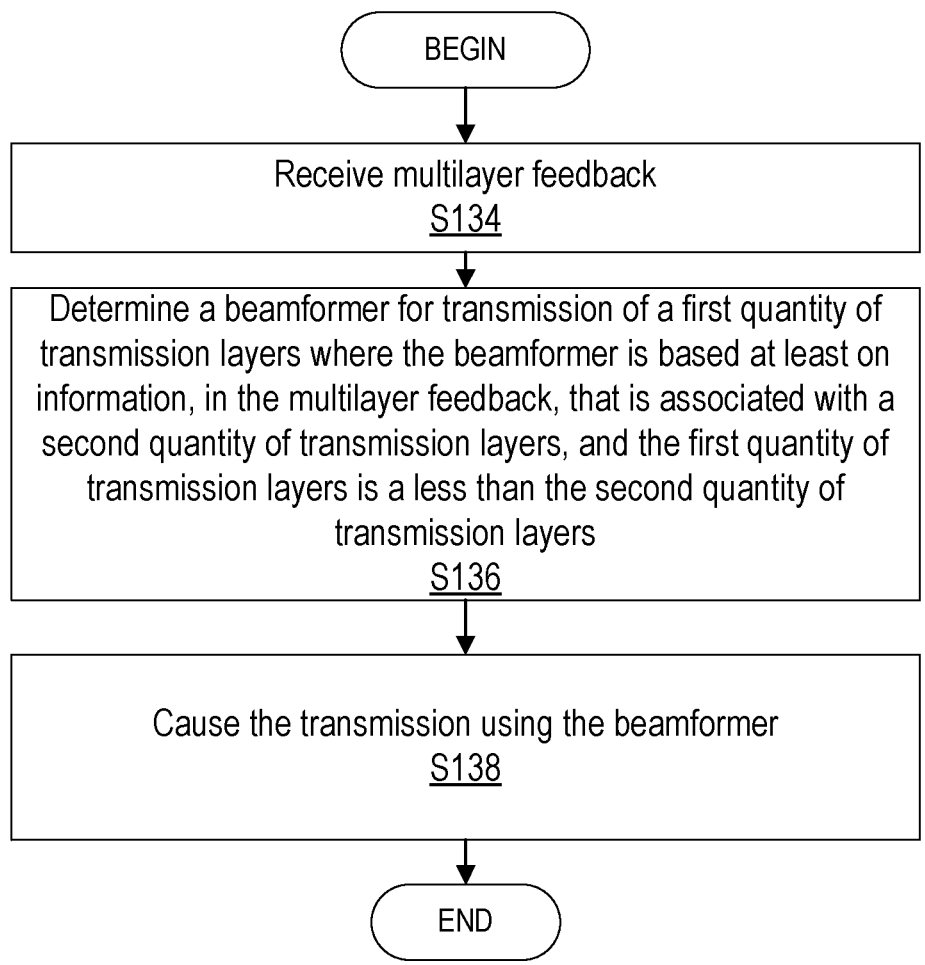
FIG. 7 is a flowchart of an example process in a network node according to some embodiments of the present disclosure.

FIG. 7 is a flowchart of an example process in a network node 16 according to one or more embodiments of the present disclosure. One or more Blocks and/or functions performed by network node 16 may be performed by one or more elements of network node 16 such as by node beamformer unit 32 in processing circuitry 68, processor 70, radio interface 62, etc. In one or more embodiments, network node 16 such as via one or more of processing circuitry 68, processor 70, node beamformer unit 32, communication interface 60 and radio interface 62 is configured to receive (Block S134) multilayer feedback, as described herein. In one or more embodiments, network node 16 such as via one or more of processing circuitry 68, processor 70, node beamformer unit 32, communication interface 60 and radio interface 62 is configured to determine (Block S136) a beamformer for transmission of a first quantity of transmission layers where the beamformer is based at least on information, in the multilayer feedback, that is associated with a second quantity of transmission layers, and where the first quantity of transmission layers is less than the second quantity of transmission layers, as described herein. In one or more embodiments, network node 16 such as via one or more of processing circuitry 68, processor 70, node beamformer unit 32, communication interface 60 and radio interface 62 is configured to cause (Block S138) the transmission using the beamformer, as described herein.

According to one or more embodiments, the multilayer feedback includes information associated with beam directions of the first quantity of transmission layers and information associated with directions of the second quantity of transmission layers. According to one or more embodiments, the determining of the beamformer for the transmission of the first quantity of transmission layers includes: combining the information, in the multilayer feedback, associated with the second quantity of transmission layers, with the information associated with the first quantity of transmission layers, generating matrices based at least on the combined information, and performing one of a single value decomposition and weight mean vector function based on the matrices to obtain the beamformer for the transmission of the first quantity of transmission layers.

According to one or more embodiments, the weighted mean function includes applying weighting coefficients to the matrices. According to one or more embodiments, the first quantity of transmission layers is n, n being greater than 1. The generating of matrices includes generating n matrices. The single value decomposition is performed for each of n matrices. The processing circuitry 68 is further configured to: select a singular vector for each single value decomposition to obtain a plurality of singular vectors; and the beamformer for the transmission of the first quantity of transmission layers being based at least on the plurality of singular vectors.

According to one or more embodiments, the beamformer for the transmission of the first quantity of transmission layers is a constant modulus beamformer. According to one or more embodiments, the multilayer feedback is a Precoding Matrix Indicator, PMI. According to one or more embodiments, the transmission using the beamformer is a single layer transmission in a physical downlink control channel.

Figure 8:
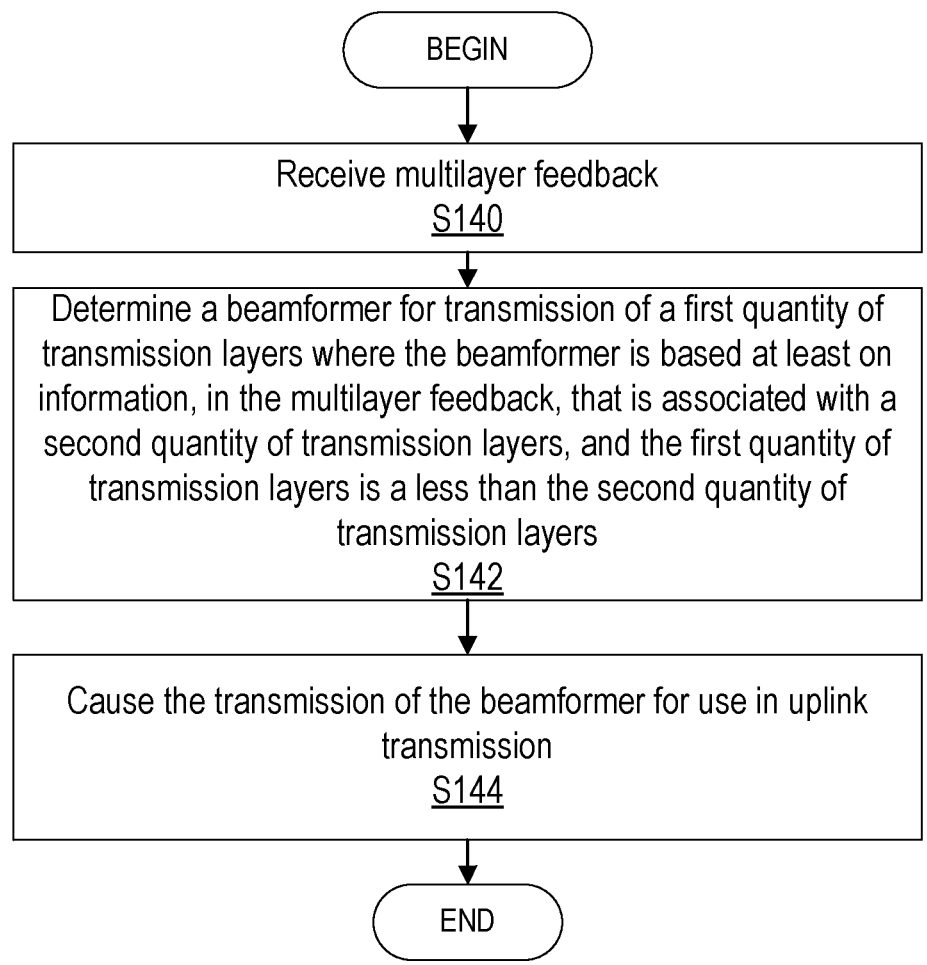
FIG. 8 is a flowchart of another example process in a network node according to some embodiments of the present disclosure.

FIG. 8 is a flowchart of another example process in a network node 16 according to one or more embodiments of the present disclosure. One or more Blocks and/or functions performed by network node 16 may be performed by one or more elements of network node 16 such as by node beamformer unit 32 in processing circuitry 68, processor 70, radio interface 62, etc. In one or more embodiments, network node 16 such as via one or more of processing circuitry 68, processor 70, node beamformer unit 32, communication interface 60 and radio interface 62 is configured to receive (Block S140) multilayer feedback, as described herein. In one or more embodiments, network node 16 such as via one or more of processing circuitry 68, processor 70, node beamformer unit 32, communication interface 60 and radio interface 62 is configured to determine (Block S142) a beamformer for transmission of a first quantity of transmission layers where the beamformer is based at least on information, in the multilayer feedback, that is associated with a second quantity of transmission layers, and the first quantity of transmission layers is a less than the second quantity of transmission layers, as described herein.

In one or more embodiments, network node 16 such as via one or more of processing circuitry 68, processor 70, node beamformer unit 32, communication interface 60 and radio interface 62 is configured to cause (Block S142) the transmission of the beamformer for use in uplink transmission, as described herein. For example, the wireless device 22 may use/apply the beamformer for multi-antenna transmission from the wireless device 22 to the network node 16 such as for uplink transmission such as on the physical uplink control channel (PUCCH). While the wireless device 22 may be equipped with a various antenna arrays, the wireless device 22 may be limited to rank 1 or low rank transmissions due to power restrictions such that the teachings here are equally applicable to various types of wireless devices 22.

In one or more embodiments, a computer readable medium (e.g., memory 72) is configured to store instructions, which when executed by a processor, cause the processor to: receive multilayer feedback, determine a beamformer for transmission of a first quantity of transmission layers where the beamformer is based at least on information, in the multilayer feedback, that is associated with a second quantity of transmission layers, and where the first quantity of transmission layers is a less than the second quantity of transmission layers, and cause the transmission using the beamformer.

According to one or more embodiments, the multilayer feedback includes information associated with beam directions of the first quantity of transmission layers and information associated with directions of the second quantity of transmission layers. According to one or more embodiments, the determining of the beamformer for the transmission of the first quantity of transmission layers includes: combining the information, in the multilayer feedback, associated with the second quantity of transmission layers, with the information associated with the first quantity of transmission layers, generating matrices based at least on the combined information, and performing one of a single value decomposition and weight mean vector function based on the matrices to obtain the beamformer for the transmission of the first quantity of transmission layers. According to one or more embodiments, the multilayer feedback is a Pre-coding Matrix Indicator, PMI, and the transmission uses the beamformer is a single layer transmission in a physical downlink control channel.

Having generally described arrangements for a low rank beamforming based at least on multi-layer feedback, details for these arrangements, functions and processes are provided as follows, and which may be implemented by the network node 16, wireless device 22 and/or host computer 24.

Some embodiments provide a low rank beamforming based at least on multi-layer feedback.

A single-user MIMO communication system where network node 16 employs a $N_v \times N_h$ 2D antenna array is considered. It may be assumed that the network node 16, such as via one or more of processing circuitry 68, processor 70, radio interface 62, node beamformer unit 32, etc., estimates the precoder and/or receives feedback to calculate a precoder to transmit to wireless device 22. For 3GPP, Type-1 CSI-RS feedback can be used to collect the precoder information from one or more wireless devices 22. For example, the PMI in 3GPP Rel 15+ contains indices: ($i_{11}$, $i_{12}$, $i_{13}$, $i_2$, RI), where $i_{11}$ and $i_{12}$ are the indices for the layer-0's directions in dimension 1 and dimension 2 of the 2D array prototype. Further, $i_{13}$ contains the information regarding the directions of the layers other than the $0^{th}$ layer. Let $u_0$ and $v_0$ denote the $N_1 \times 1$ and $N_2 \times 1$ dimensional steering vectors for layer-0 transmission, respectively. Here, the ($N_1$, $N_2$) tuple indicates the codebook configuration of Type-1 as defined in wireless communication standards such as 3GPP Technical Specification (TS) 38.314. The scenario with RI>1 is considered. RI=1 is a case where the feedback precoder can be directly used. The final precoder for each dimension can be obtained by the underlying CSI-RS port to antenna mapping denoted by $W_{p2a,h}$ and $W_{p2a,v}$ for horizontal and vertical dimension of the array, respectively.

Matrices $U[i_{11},i_3] = W_{p2a,h}[u_0 \; u_1 \; \ldots \; u_{RI-1}]$ and $V[i_{12},i_3] = W_{p2a,v}[v_0 \; v_1 \; \ldots \; v_{RI-1}]$ are defined where each column indicates the steering vector for layer-l, l=0, 1, ..., RI−1 for dimension 1 and 2, respectively. For each dimension, the SVD is obtained as $$U = A_{N_v \times RI} \Gamma B^H$$

and $$V = C_{N_v \times RI} \Lambda D^H.$$

Note that the matrices $A=[a_0 \ldots a_{RI-1}]$ and $C=[c_0 \ldots c_{RI-1}]$ correspond to the eigenvectors of $UU^H$ and $VV^H$, respectively. Assuming that the $\Gamma$ and $\Lambda$ contains the singular values in descending order along the diagonal, the beamformer for single layer transmission may be $$w_{AZ} = a_0$$

and $$w_{EL} = c_0,$$

for azimuth and elevation, respectively.

An alternative beamformer is to employ a constant modulus beamformer by using only the phase tapering information from $a_0$ and $c_0$ such that $$w_{AZ}^{CM} = e^{j \angle a_0}$$

and $$w_{EL}^{CM} = e^{j \angle a_0}$$

where $e^{j \angle x} = [e^{j \angle x_0} \ldots e^{j \angle x_{N-1}}]^T$ with $x = [x_0 \ldots x_{N-1}]^T$. One advantage of using constant modulus beamformer in this method is that the radio frequency (RF) branches such as at the wireless device 22 can be operated at full power while at the same time the resulting constant modulus beamformer can attain a very similar radiation pattern to the target radiation pattern.

An extension to the above method can be made by suitably weighting the beams for individual layer directions. To that end, the scaled precoders are obtained for dimension 1 and 2, respectively, as $$U_S = U \, \text{diag}(\alpha_0, \ldots, \alpha_{RI-1})$$

and $$V_S = V \, \text{diag}(\beta_0, \ldots, \beta_{RI-1}).$$

The beamformer for the single-layer transmission is then given by eigenvectors of $U_S U_S^H$ and $V_S V_S^H$ corresponding to largest singular value. The network node 16, such as via one or more of processing circuitry 68, processor 70, radio interface 62, node beamformer unit 32, etc., can utilize any adaptive or non-adaptive heuristics to determine suitable layer weighting coefficients $\alpha=(\alpha_0 \ldots \alpha_{RI-1})$ and $\beta=(\beta_0 \ldots \beta_{RI-1})$ providing desirable PDCCH reception quality. If a feedback from the wireless device 22 is available through Type-2 CSI-RS feedback, these weight scales can also be used for the corresponding beams. If no feedback related to relative strength of the beams are available, multiple weighting options can be employed such as via one or more of processing circuitry 68, processor 70, radio interface 62, node beamformer unit 32, etc., to create single beams with different beam strength for each direction corresponding to ranks $\in \{0, 1, \ldots, RI-1\}$.

In cases where a beamformer for a L'<L layers, e.g., a smaller number of layers than RI (feedback from the wireless device 22) is to be generated, L' block matrices are created, each with $l_i$, i=0, ... L'−1, non-overlapping layers such that $\Sigma_{i=0}^{L'-1} l_i$, and apply the single-layer approach defined above to each block separately, and select left singular vector corresponding to strongest singular value from each block. For rank−1 blocks, the beamformer in that partition (e.g., no need to get the singular values since they are the same) is used.

A lower complexity alternative to the SVD approach is to employ a weighted mean vector to get the low-rank precoder. In this case, if the correlations between the precoder among different layers is less than a predefined threshold, e.g., $|\langle u_i, u_j\rangle|^2 \le D_{th}$, the precoders obtained are $$w_{AZ} = U\alpha$$

$$w_{EL} = V\beta$$

where $\alpha$ and $\beta$ denote the RI×1 weight vectors for azimuth and elevation beams, respectively. These values can be different from those used for SVD weighting method above. In cases of large tapering loss, constant modulus weights can be used in this case as well. Sub-grouping can also be applied in case more than one rank is required to send the data.

The selection of weighted SVD and weighted-mean vector methods can be decided by the network node 16, such as via one or more of processing circuitry 68, processor 70, radio interface 62, node beamformer unit 32, etc., depending on (i) the angular separation between the directions of the layers, (ii) knowledge of per layer signal strength, and (iii) the resulting tapering loss of the low rank precoder. If strength of each layer are similar to each other and the spatial separation between layers is larger than a threshold, weighted-mean sum can be employed to generate the low-rank precoder. Alternatively, if the angular separation between different layers is smaller than some threshold, weighted SVD can be employed.

In some scenarios, the feedback (i.e., multi-layer feedback) may not be available in a periodic manner. In this case, due to potential variations in spatial positions of the receivers/wireless devices 22, the beam pattern of PDCCH can be gradually transformed to ensure receiver of the wireless device 22 is covered properly. The low-rank precoder is updated as follows:

$$w_{AZ}^{(t)} = w_{AZ} \odot w_Q$$

$$w_{EL}^{(t)} = w_{EL} \odot w_Q$$

where $$w_Q = \left[ e^{j\alpha_t \left(n - \frac{N-1}{2}\right)^2}, n = 0, \ldots, N-1 \right]$$

with $N=N_h$ for azimuth and $N=N_v$ for elevation beams, $\alpha_t$ with $$0 \le \alpha_t \le \frac{4\phi_{max}}{(N-1)^2}$$

is a design parameter to control the pace of beam pattern change, and $\odot$ denotes the element-wise product. The time index t represents the delay from the most recent precoder feedback instant. The network node 16, such as via one or more of processing circuitry 68, processor 70, radio interface 62, node beamformer unit 32, etc., can employ location and speed context of the wireless device 22 to suitably select the values at for each transmission instance t. $\phi_{max}$ indicates the largest phase adjustment value at the edge elements of the array and can be selected independently for vertical and horizontal dimensions of the array to achieve desired beam widening in elevation and azimuth, respectively. $w_{AZ}$ and $w_{EL}$ precoders can be replaced by $w_{AZ}^{CM}$ or $w_{EL}^{CM}$, respectively, to reduce the tapering loss. $\alpha_t$ can be gradually increased from 0 to the maximum value allowed over different transmission instances if a CSI-RS feedback is missed, and can be reset to 0 when a reliable CSI-RS feedback or precoder estimate is available for the next transmission.

In cases where the directions corresponding to the precoders for different layers are widely separated from each other, the beam broadening approach can be adjusted for $\alpha_t \ge \alpha_{threshold}$, by re-employing SVD or weighted-mean onto low-rank precoders using auxiliary beam directions in between the layers. To that end, the following is obtained $$U' = [w_{AZ} w_{aux,az}]$$

and $$V' = [w_{EL} w_{aux,el}]$$

and then the quadratic phase adjustment is applied on the resulting SVD or weighed-mean (or their constant-modulus alternatives) using U' and V'. Here, $w_{aux,az}$ and $w_{aux,el}$ denote the $N_h \times L_{aux,az}$ and $N_v \times L_{aux,el}$ auxiliary spatial DFT sub-matrices corresponding to the sampled directions in between the layers. Note that $w_{AZ}$ and $w_{EL}$ can be replaced by constant modulus alternatives if desired or needed.

If the time from the most recent precoder feedback exceeds some threshold value, e.g., $t \ge \tau_{th}$, the beam weights can be replaced by a common beamforming weight.

Figure 9:
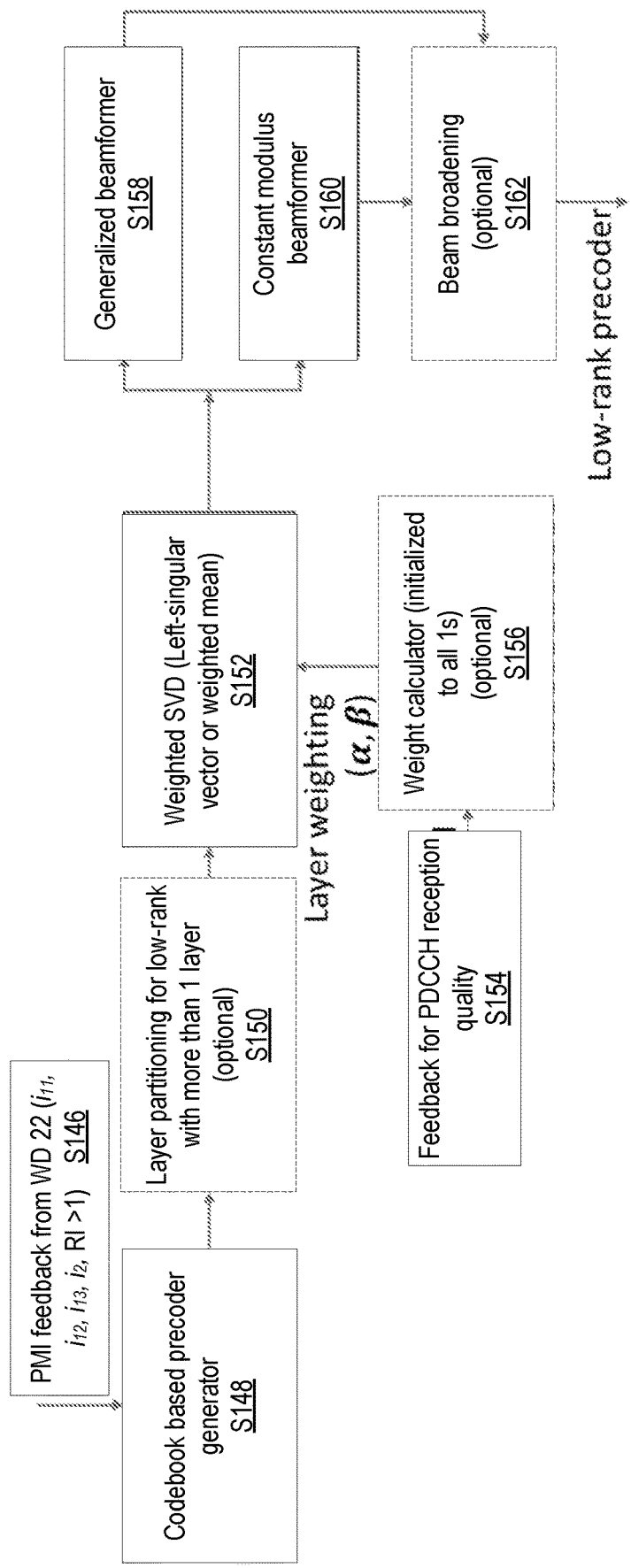
FIG. 9 is a flowchart of another example process in a network node according to some embodiments of the present disclosure.

FIG. 9 is a flow diagram of an example process for PDCCH beamformer calculation using precoder feedback according to the principles of the disclosure. In general, layer weighting can be enabled or disabled such as via one or more of processing circuitry 68, processor 70, radio interface 62, node beamformer unit 32, etc., based on the availability of PDCCH reception quality over time. The generalized beamformer is based on either left-singular vector or weighted-mean vector. A constant modulus scheme can be enabled such as via one or more of processing circuitry 68, processor 70, radio interface 62, node beamformer unit 32, etc., in case of, for example, high-EIRP transmissions. In case feedback is intermittently available, beam-broadening module can be enabled.

In particular, PMI feedback (e.g., $i_{11}$, $i_{12}$, $i_{13}$, $i_2$, RI) is received where RI is greater than 1, as discussed herein (Block S146). A codebook based precoder is generated based at least on the PMI feedback, as described herein (Block S148). Layer partitioning for a low rank (i.e., a rank lower than RI from the PMI) with more than 1 layer may optionally be performed, as described herein (Block S150). Weighted SVD (left-singular vector) or weighted mean may be performed, as described herein (Block S152).

Feedback for PDCCH reception quality may be optionally received, as described herein (Block S154). The weight calculator may optionally be configured to generate (Blocks S156) layer weighting, as described herein. In one example, the weight calculator is initialized to all 1s. Referring back to Block S152, the layer weighting generated by the weight calculator may optionally be considered or used for the weighted SVD determine or weighted mean determination. In one or more embodiments, the a generalized beamformer or a constant modulus beamformer are generated, as described herein (Blocks S158-S160). In one or more embodiments, beam broadening is optionally performed (Block S162). The result/output of the flow diagram of FIG. 9 is a low-rank precoder for transmission, as described herein. In one or more embodiments, the low-rank precoder is associated with a rank of 1 or a rank lower than the RI in the PMI, as described herein.

Figure 10:
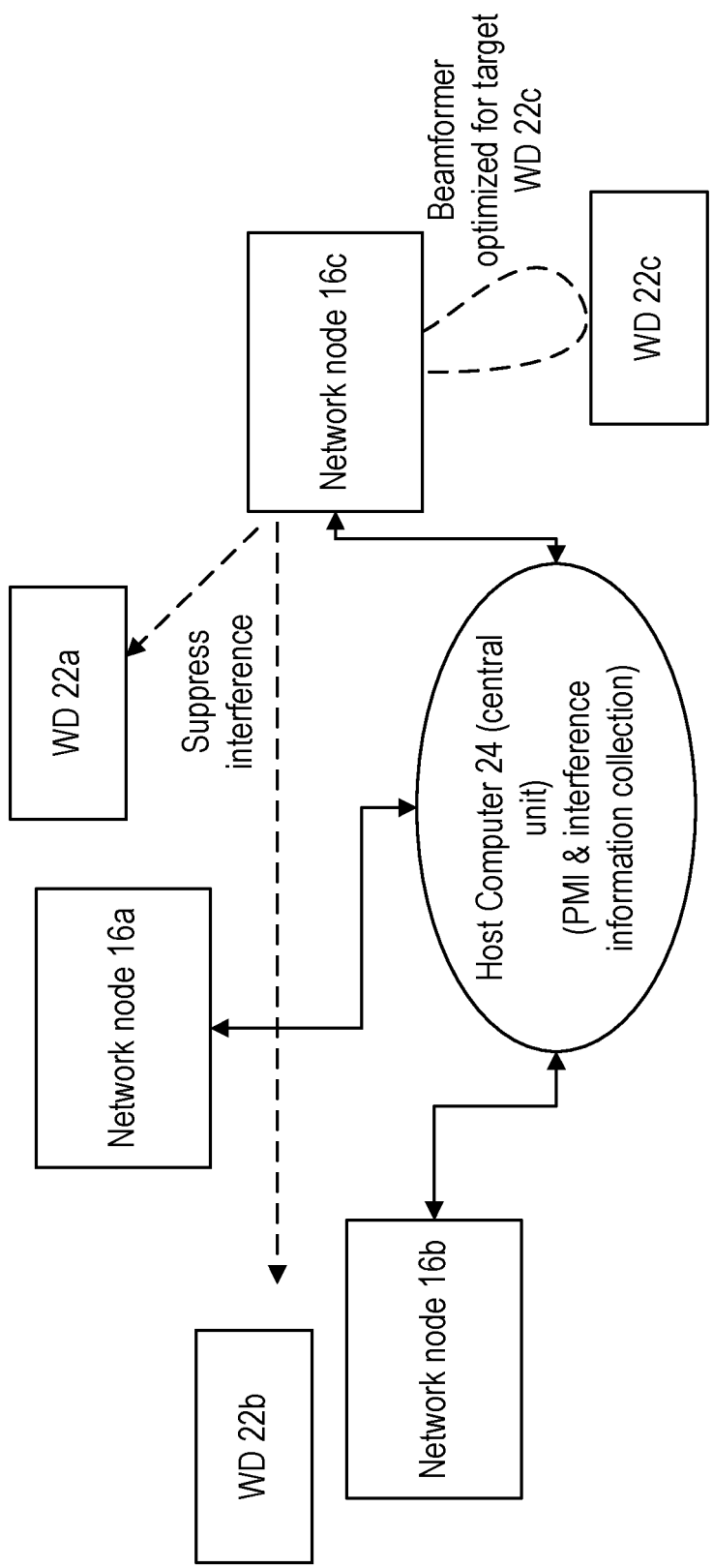
FIG. 10 is diagram of cloud implementation according to some embodiments of the present disclosure.
Figure 11:
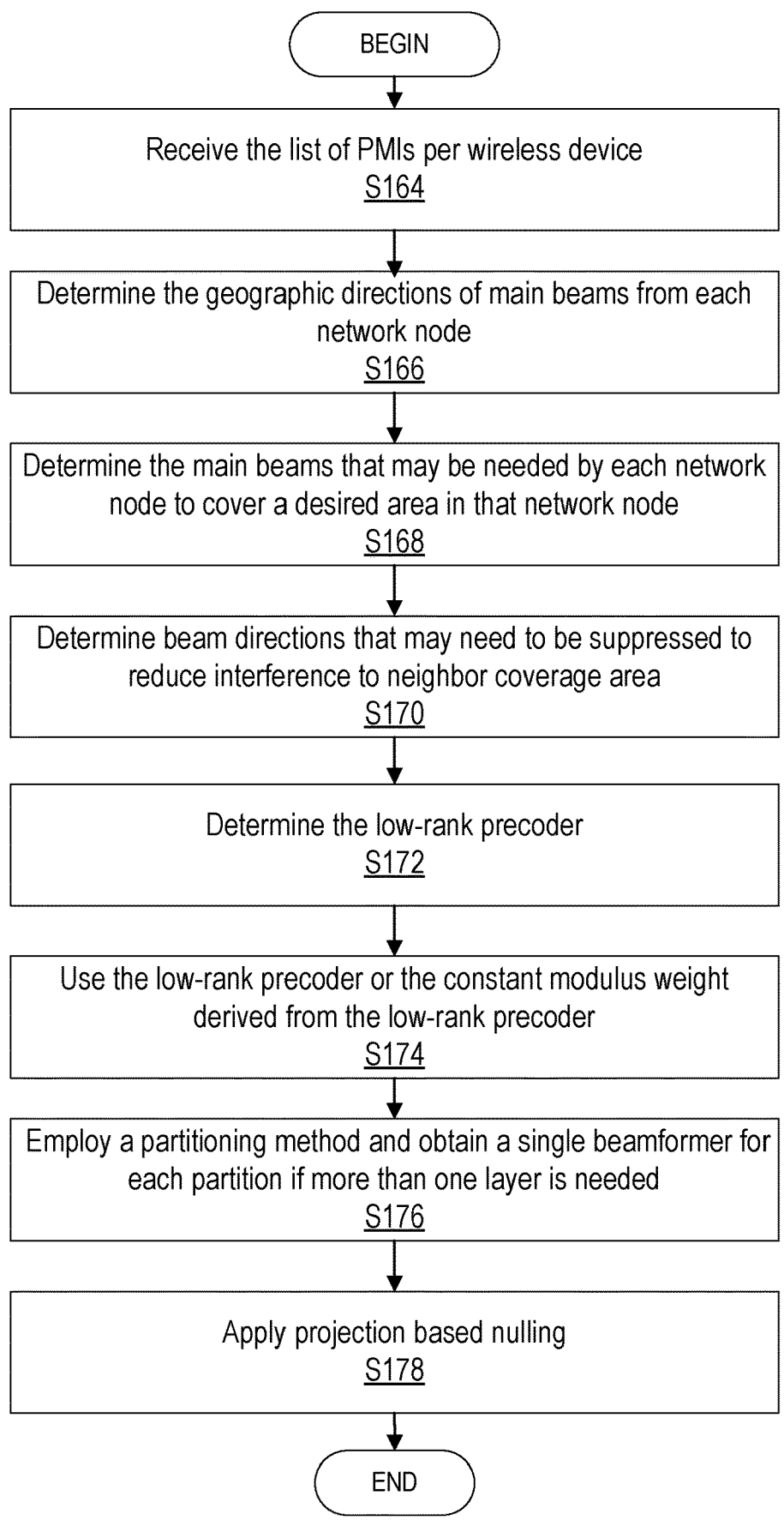
FIG. 11 is a flowchart of an example process for beamformer calculation using precoder feedback according to some embodiments of the present disclosure.

FIG. 10 is a block diagram of a cloud implementation according to the principles of the disclosure. FIG. 11 is a flowchart of an example process in a host computer 24 according to some embodiments of the present disclosure. One or more Blocks and/or functions performed by host computer 24 may be performed by one or more elements of host computer 24 (i.e., central unit) such as by central beamformer unit 31 in processing circuitry 42, processor 44, communication interface 40, etc. In one or more embodiments, host computer 24 such as via one or more of processing circuitry 42, processor 44, central beamformer unit 31, and communication interface 40 is configured to collect PMI feedback information and resulting signal reception qualities for channels of interest and any other auxiliary information to estimate directional information of nearby network nodes 16 that may be exposed to interference resulting from the network node 16 transmission. The technique described herein can weigh the precoder columns to suppress the signal propagation towards unintended directions.

In one or more embodiments, host computer 24 such as via one or more of processing circuitry 42, processor 44, central beamformer unit 31, and communication interface 40 is configured to performs the following set of steps to determine the precoder:
1. Receive the list of PMIs per wireless device 22 (Block S164).
2. Determine the geographic directions of main beams from each network node 16 (Block S166).
3. For each network node 16, the host computer 24 is configured to:
    a. Determine the main beams that may be needed by each network node 16 to cover the desired area in that network node 16 (Block S168). Set their weights α and β to 1. In one or more embodiments, "main beams" may refer the beams have at least one beam characteristic meet a criterion such as meeting a threshold or having a beam direction toward the wireless device 22, etc.
    b. Determine the beam directions that may need to be suppressed to reduce interference to neighbor coverage area. Set their weights α and β to 0 (Block S170).
    c. Determine the low-rank precoder as described above such as with respect to FIG. 7 (Block S172).
    d. Use the low-rank precoder or the constant modulus weight derived from this low-rank precoder (Block S174).
    e. If more than one layer is needed for transmission, employ the partitioning method and obtain a single beamformer for each partition (Block S176).
4. Apply projection based nulling as needed, i.e., this step is optional (Block S178).
    a. The host computer 24 may observe that the neighboring network node 16 may end-up with beamformers for low-rank transmissions that may create partially overlapping beams. In those cases, the beams can be selectively nulled in desired nulling directions using $$P_{null,dim}=(I_{M_{dim}}-w(w^H w)^{-1} w^H)$$

where w is the $M_{dim} \times L_n$ precoding matrix weights (for the dimension 1 or 2) that creates the beams in the overlapping directions, $L_n$ is the number of beams to be nulled, and $M_{dim}$ is the number of antennas in dimension-dim, $dim \in \{1,2\}$ In one or more embodiments, the host computer 24 may be a central network node 16.

Therefore, one or more embodiments described herein create one or more beamformer weights that can be used for single layer transmissions (e.g., PDCCH transmissions) or low-rank transmissions, whether the beamforming and diversity gains obtained through codebook based SU-MIMO via CSI-RS feedback is able to be cultivated. In other words, single or low-rank transmission are configured using multi-layer feedback, thereby advantageously using the beamforming and diversity gains.

One or more embodiments described herein advantageously have a low-computation complexity since they may require determining only the eigen vector corresponding to the largest singular value, or eigen-vectors corresponding to a few of largest eigenvalues as opposed to, for example, full matrix processing.

In one or more embodiments, since the PMI indicates the suitable directions considering the multi-path propagation, the radiation pattern resulting from the one or more embodiments can continue utilizing all the propagation paths according to their contribution to overall performance as observed by the wireless device 22.

One or more embodiments described herein can be extended to the case where there is CSI-RS feedback for RI layers and a transmission with L layers such that 1<L<RI is performed. In order to transmit L layers, two alternatives are proposed: (i) evaluate L eigenvectors corresponding to largest L singular values, or (ii) partition the directions of interest into L groups and create a single direction for each partition.

One or more embodiments described herein can dynamically increase the beam width of low-rank multi-beam pattern. This capability can be used to compensate the lack of precoder feedback information in case network load or reliability prevents accurate reception of feedback information.

One or more embodiments described herein can utilize any additional feedback or information that provides the relative strength or significance of the desired beam directions and determine suitable beamforming weights for the low-rank transmissions.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
CSI-RS Channel State Information-Reference Signal UE
gNB Base station for New Radio, i.e., a type of network node 16
MIMO Multiple-Input Multiple-Output
PDCCH Physical Downlink Control Channel
PMI Precoding Matrix Index
RI Rank Indicator
User Equipment, i.e., a type of wireless device 22

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:
processing circuitry configured to:
 receive multilayer feedback;
 determine a beamformer for transmission of a first quantity of transmission layers, the beamformer being based at least on information, in the multilayer feedback, that is associated with a second quantity of transmission layers, the first quantity of transmission layers being a less than the second quantity of transmission layers, including:
  combining the information, in the multilayer feedback, associated with the second quantity of transmission layers, with information associated with the first quantity of transmission layers;
  generating matrices based at least on the combined information; and
  performing one of a single value decomposition and weight mean vector function based on the matrices to obtain the beamformer for the transmission of the first quantity of transmission layers; and
 cause the transmission using the beamformer.

2. The network node of claim 1, wherein the multilayer feedback includes information associated with beam directions of the first quantity of transmission layers and information associated with directions of the second quantity of transmission layers.

3. The network node of claim 1, wherein the weighted mean function includes applying weighting coefficients to the matrices.

4. The network node of claim 1, wherein the first quantity of transmission layers is n, n being greater than 1;
the generating of matrices includes generating n matrices;
the single value decomposition being performed for each of n matrices; and
the processing circuitry being further configured to:
select a singular vector for each single value decomposition to obtain a plurality of singular vectors; and
the beamformer for the transmission of the first quantity of transmission layers being based at least on the plurality of singular vectors.

5. The network node of claim 1, wherein the beamformer for the transmission of the first quantity of transmission layers is a constant modulus beamformer.

6. The network node of claim 1, wherein the multilayer feedback is a Pre-coding Matrix Indicator, PMI.

7. The network node of claim 1, wherein the transmission using the beamformer is a single layer transmission in a physical downlink control channel.

8. A method implemented by a network node that is configured to communicate with a wireless device, the method comprising:
receiving multilayer feedback;
determining a beamformer for transmission of a first quantity of transmission layers, the beamformer being based at least on information, in the multilayer feedback, that is associated with a second quantity of transmission layers, the first quantity of transmission layers being a less than the second quantity of transmission layers, including:
combining the information, in the multilayer feedback, associated with the second quantity of transmission layers, with information associated with the first quantity of transmission layers;
generating matrices based at least on the combined information; and
performing one of a single value decomposition and weight mean vector function based on the matrices to obtain the beamformer for the transmission of the first quantity of transmission layers; and
causing the transmission using the beamformer.

9. The method of claim 8, wherein the multilayer feedback includes information associated with beam directions of the first quantity of transmission layers and information associated with directions of the second quantity of transmission layers.

10. The method of claim 8, wherein the weighted mean function includes applying weighting coefficients to the matrices.

11. The method of claim 8, wherein the first quantity of transmission layers is n, n being greater than 1;
the generating of matrices includes generating n matrices;
the single value decomposition being performed for each of n matrices; and
the method further comprising selecting a singular vector for each single value decomposition to obtain a plurality of singular vectors; and
the beamformer for the transmission of the first quantity of transmission layers being based at least on the plurality of singular vectors.

12. The method of claim 8, wherein the beamformer for the transmission of the first quantity of transmission layers is a constant modulus beamformer.

13. The method of claim 8, wherein the multilayer feedback is a Pre-coding Matrix Indicator, PMI.

14. The method of claim 8, wherein the transmission using the beamformer is a single layer transmission in a physical downlink control channel.

15. A non-transitory computer readable medium configured to store instructions, which when executed by a processor, cause the processor to:
receive multilayer feedback;
determine a beamformer for transmission of a first quantity of transmission layers, the beamformer being based at least on information, in the multilayer feedback, that is associated with a second quantity of transmission layers, the first quantity of transmission layers being a less than the second quantity of transmission layers, including:
combining the information, in the multilayer feedback, associated with the second quantity of transmission layers, with information associated with the first quantity of transmission layers;
generating matrices based at least on the combined information; and
performing one of a single value decomposition and weight mean vector function based on the matrices to obtain the beamformer for the transmission of the first quantity of transmission layers; and
cause the transmission using the beamformer.

16. The non-transitory computer readable medium of claim 15, wherein the multilayer feedback includes information associated with beam directions of the first quantity of transmission layers and information associated with directions of the second quantity of transmission layers.

17. The non-transitory computer readable medium of claim 15, wherein the multilayer feedback is a Pre-coding Matrix Indicator, PMI; and
the transmission using the beamformer is a single layer transmission in a physical downlink control channel.

18. The non-transitory computer readable medium of claim 15, wherein the weighted mean function includes applying weighting coefficients to the matrices.

19. The non-transitory computer readable medium of claim 15, wherein the first quantity of transmission layers is n, n being greater than 1;
the generating of matrices includes generating n matrices;
the single value decomposition being performed for each of n matrices; and
the method further comprising selecting a singular vector for each single value decomposition to obtain a plurality of singular vectors; and
the beamformer for the transmission of the first quantity of transmission layers being based at least on the plurality of singular vectors.

20. The non-transitory computer readable medium of claim 15, wherein the beamformer for the transmission of the first quantity of transmission layers is a constant modulus beamformer.

* * * * *